Oct. 30, 1934.  W. T. R. BINDLEY  1,979,187
CATALYTIC TREATMENT OF ORGANIC AND INORGANIC SUBSTANCES
Filed March 23, 1932
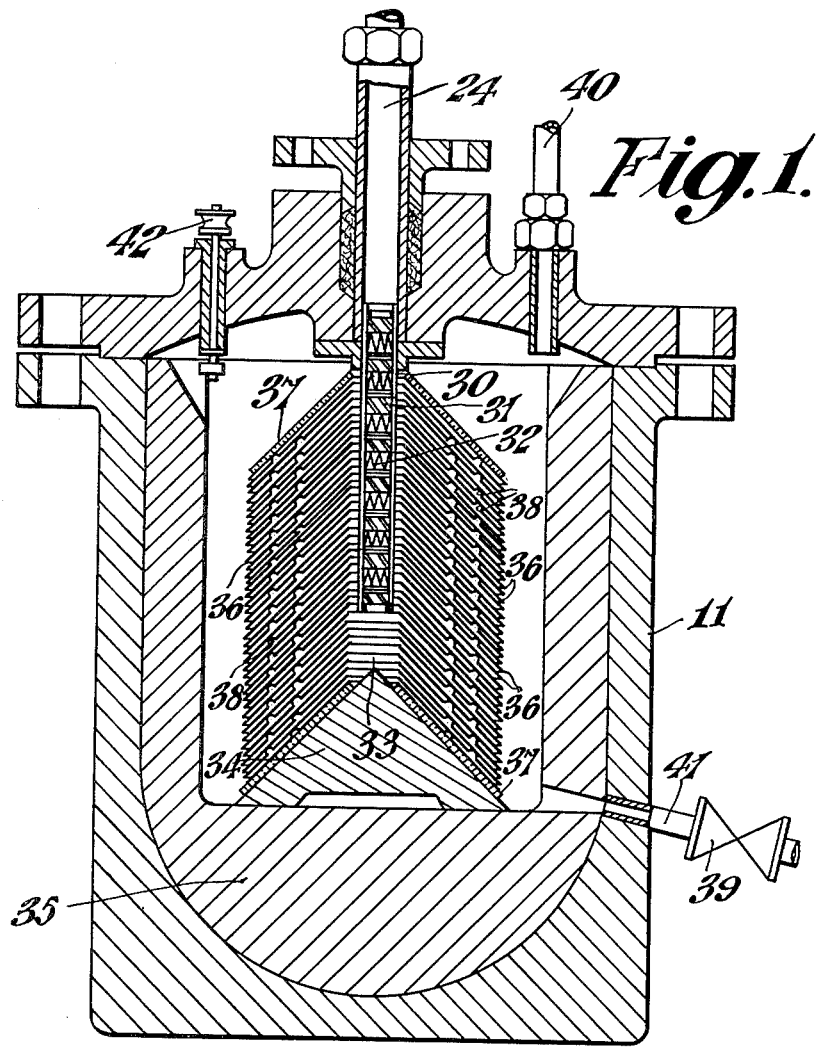
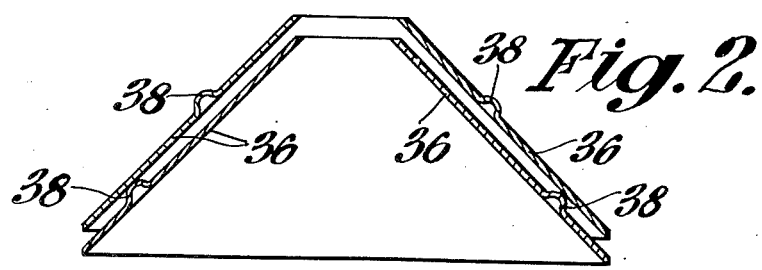
Inventor:
William Thomas Robinson Bindley,
By Byrnes Townsend & Potter,
Attorneys.

Patented Oct. 30, 1934

1,979,187

UNITED STATES PATENT OFFICE 1,979,187

CATALYTIC TREATMENT OF ORGANIC AND INORGANIC SUBSTANCES

William Thomas Robinson Bindley, London, England, assignor to Robinson Bindley Processes Limited, Mitcham, England Application March 23, 1932, Serial No. 600,752
In Great Britain April 18, 1931

5 Claims. (Cl. 23—236)

This invention relates to the catalytic treatment of coals, lignites, shales, peat and other carbonaceous substances, and is applicable also to the treatment by catalytic action of mineral, animal, vegetable, fish and other oils, and fats, gas etc., as for example by hydrogenation, oxidization, chlorination, conversion, etc., or to bring about the combination of organic or inorganic substances or compounds for the production of acids, alkalies or other substances.

This invention is, however, more particularly concerned with the treatment of coal by what is known in general as the hydrogenation or conversion process the general purpose of which is to convert the hydro-carbons and fixed carbons of coal, gases, and the like, by hydrogenation or conversion into a spirit suitable for example as fuel for use in internal combustion engines.

The essential feature of the invention is the use of a silicon ester as the means of attaching a catalyst in powdered or granular form positively to some support.

The invention therefore consists of a process for the catalytic treatment of liquids, semi-liquids and gases wherein the liquid, semi-liquid or gas is caused to pass in contact with a catalytic surface composed of a granular or powdered catalytic material positively attached to a supporting material by means of a silicon ester. The attachment of the powder or granules to the support is effected by the use of a silicon ester which is not only effective to cause the adhesion but is beneficial to the reaction. The term silicon ester may be taken to mean readily hydrolyzable esters of acids containing silicon.

In carrying the invention into practice according to one method the granular or powdered catalytic material is applied to the catalyst supports or carriers by first spraying or otherwise applying silicon ester to the supports or carriers— which may be of metal or other non-combustible material—after they have been heated to a temperature sufficient to remove any chill, and then dusting or sprinkling the catalytic powder or granules over the surface while it is still tacky. After this treatment the catalysts so produced can be heated in an atmosphere of reducing gas.

The liquid or gas to be treated is caused to pass continuously over and in contact with the catalytic surfaces for example, in the manner hereinafter described.

The foregoing process may be employed with catalysts of known composition; the catalysts I propose to employ are prepared from oxides of cobalt and manganese, in some cases in admixture with chromium and cerium oxides, these oxides being later heated in hydrogen or other reducing gas.

Cerium oxide and chromium, in metal or oxide form, may be added and the whole intimately mixed.

The mixed powder of metals and oxides of metals is caused to adhere to the catalyst carriers as before described.

As before mentioned the process is suitable for the treatment of either liquids or gases and actual experiments have shown that gases can be converted into hydrocarbon oil by the process.

The accompanying drawing shows a form of apparatus employing the invention.

Figure 1 is a sectional view of a catalyzing vessel or hydrogenator constructed according to the preferred form, and Figure 2 is a detail view illustrating the preferred form of the supports for the catalyst.

Referring specifically to Figure 1 the material to be treated and the hydrogen or other gas passes through the pipe 24 into an emulsifier 30, which in the example shown, consists of deflectors 31 and wire gauze separators 32 but this arrangement may be replaced with any device which will ensure an intimate emulsified mixture of the material to be treated and hydrogen or other gas passing into the space 33 between the bottom of the emulsifier and the apex of the cast iron cone 34 which latter is provided resting upon the bottom of the refractory lining 35 of the cast iron vessel 11.

Upon this cone 34 a series of the conical catalyst supports 36 are arranged superimposed one upon the other, asbestos cones 37 being arranged at the top and bottom of the pack.

The conical catalyst supports 36 are shown in detail in Figure 2 and it will be seen that small depressions or punchings 38 are provided to space the supports apart. One or both of the surfaces of each of the supports is supplied with the catalyst in powdered form.

The foregoing process and apparatus may be employed with catalysts of known composition but the catalyst I propose to employ consists of monazite sand showing radio-activity and mixed with cobalt or cobalt and nickel, these metals having been previously powdered and heated in hydrogen or other reducing gas in order to remove any surface oxidation.

Precipitated copper, which has been subjected to treatment by a reducing gas, is mixed with the monazite sand and cobalt or cobalt and nickel. Cerium oxide is added and preferably chromium, in metal or oxide form, is also added and the whole intimately mixed.

The mixed powder of metals and oxides of metals can be made to adhere to the catalyst carriers 36 which may be a metal, for example, iron or any suitable non-combustible material such as asbestos, by means of a silicon ester or esters, preferably dissolved in a suitable medium or mediums, for example alcohol.

The catalyst carriers after being previously warmed or heated are then dipped, sprayed, painted or covered in any suitable manner with the silicon ester or esters and the mixture constituting the powdered catalyst applied by dusting, sprinkling or by any other suitable means, while the silicon ester or esters are still tacky. After this treatment the catalysts can be heated preferably in an atmosphere of reducing gas if required.

In operation the material to be treated passes into the space 33 and under its pressure rises to the top of the annular space between the emulsifier 30 and the cones 36 and as its only outlet is by way of the narrow passages between the conical catalyst supports 36 it is constrained to pass through the passages between the cones 36 and thus in intimate contact with the catalyst spread over a very large total area. If the valve 39 is kept closed the resultant fluid passes away through the outlet pipe 40. The pipe 41 is a draw off or sludge pipe with which the catalyzing vessel or hydrogenator is provided and 42 indicates the terminal of an electric heater (not shown) by means of which the desired temperature in the catalyzing vessel or hydrogenator may be maintained.

The hydrogenating gas is not necessarily pure hydrogen but a mixed gas may be used, such as water-gas produced from coal direct.

The hydrogen or mixed water-gas is compressed to the pressure it is desired to maintain in the catalyzing vessel; and prior to passing into same the gas is heated by the compression and if necessary by additional heat applied on its passage from the compressor.

Suitable temperatures and pressures for a quick re-action will, of course, depend upon the nature of the material to be treated and the large superficial area of the heated catalysts affords a definite means of ensuring a very intimate contact between the material to be treated and the catalyst which is essential for rapid re-action. The process is continuous as the outflow of the lighter bodies can be made to synchronize with the inlet of material or gas to be treated and the hydrogenating or converting gas. The character of the product can be controlled (a) by the rate of flow through the catalyzing vessel (b) by adjustments as regards the quantity of hydrogen or other gas admitted to act upon or be combined with the material being treated, (c) by pressures, and (d) by temperature. The working temperatures and pressures, will of course, vary with the particular material or gas being treated and in experiments with coal gas it has been found that satisfactory results are attained when the gas is introduced into the pipe line leading to the catalyzing vessel or hydrogenator at a pressure of less than 50 lbs. to the square inch and the temperature in the catalytic vessel or hydrogenator maintained in the region of 230 degrees centigrade. It may not be necessary to supply heat to the catalyzing vessel or hydrogenator.

It will be seen that the apparatus hereinbefore described not only ensures the passage of the material or gas to be treated in intimate contact with a very large area of catalyst, but the removal of the top cover of the catalyzing vessel or hydrogenator permits the catalyst supports to be readily removed and replaced and the interior of the vessel cleaned or renovated.

What I claim and desire to secure by Letters Patent is:—

1. The process of preparing a catalyzer comprising the steps of applying a silicon ester to a non-combustible supporting material and then applying a powdered catalyst to the silicon ester coating.

2. The process of preparing a catalyzer comprising the steps of warming a non-combustible catalyst carrier, applying thereto a silicon ester and applying a powdered catalytic material to the silicon ester while the ester is still tacky.

3. The process of preparing a catalyzer comprising the steps of warming a non-combustible catalyst carrier, applying thereto a silicon ester and applying a powdered catalytic material to the silicon ester while the ester is still tacky and finally heating the treated structure in an atmosphere of reducing gas.

4. Process for catalytic hydrogenating which comprises contacting the fluid to be hydrogenated with a catalyzer comprising a catalyst in divided form attached to carriers by applying thereto a silicon ester and then applying the catalyst while the silicon ester is still tacky.

5. A catalyzer comprising a non-combustible catalyst carrier and a catalytic material in divided form attached thereto by applying thereto a silicon ester and then applying the divided catalytic material to the silicon ester while the silicon ester is still tacky.

WILLIAM THOMAS ROBINSON BINDLEY.